United States Patent
Faria

[15] 3,649,174
[45] Mar. 14, 1972

[54] PROCESS FOR PREPARING ANTIMONY PHOSPHATE

[72] Inventor: Sixdeniel Faria, Towanda, Pa.
[73] Assignee: Sylvania Electric Products Inc.
[22] Filed: Sept. 26, 1969
[21] Appl. No.: 861,493

[52] U.S. Cl. .......................................................23/105
[51] Int. Cl. ................C01b 25/00, C01b 25/16, C01b 25/26
[58] Field of Search .....................................23/105

[56] References Cited

FOREIGN PATENTS OR APPLICATIONS

| 384,054 | 4/1963 | Japan..........................................23/105 |
| 792,997 | 4/1958 | Great Britain..............................23/105 |

*Primary Examiner*—Earl C. Thomas
*Assistant Examiner*—Gregory A. Heller
*Attorney*—Norman J. O'Malley, Donald R. Castle and William H. McNeill

[57] ABSTRACT

Anhydrous antimony orthophosphate is prepared by reacting antimony oxide and concentrated hydrochloric acid, under controlled temperature conditions, and slowly adding to the reactant solution a water soluble orthophosphate source in sufficient concentration to precipitate antimony phosphate. After digesting for about 1 hour, the solid antimony phosphate is removed and washed with dilute phosphoric acid, followed by deionized water. Especially preferred as a water soluble othophosphate source is diammonium hydrogen phosphate.

8 Claims, No Drawings

PROCESS FOR PREPARING ANTIMONY PHOSPHATE

BACKGROUND OF THE INVENTION

This invention relates to an improved method for preparing anhydrous antimony phosphate. Specifically, it relates to a process for preparing anhydrous antimony phosphate by precipitating solid antimony phosphate from acid antimony solutions with a water soluble orthophosphate source.

The preparation of antimony phosphate has been known for some time. Mellor lists it in *Inorganic & Theoretical Chemistry*, Vol. 17, p. 585. Robbins, in *Journal of Inorganic and Nuclear Chemistry*, Vol. 19, 1961, pp. 183–5, prepared antimony phosphate by firing a dry mixture of antimony trioxide, $Sb_2O_3$, and orthophosphoric acid, $H_3PO_4$, at elevated temperatures. Antimony trioxide and orthophosphoric acid were mixed together in suitable proportions to provide a range of $Sb_2O_3:P_2O_5$ ratios between 5:1 and 1:2, with sufficient water added to give the mixture the consistency of a thin cream. The suspension was transferred to a porcelain ball mill containing a suitable charge of porcelain balls and rolled for 16 hours. The suspension was transferred to a Pyrex dish and evaporated to dryness in an air oven at 130° C. The resulting white solid was ground, sieved, and heated to 1,200° C. to yield antimony phosphate $SbPO_4$.

This method of obtaining $SbPO_4$ is undesirable and impractical, especially for producing large quantities, because of the high temperature involved, the length of time required for processing, and the possible formation of other unstable antimony salts, i.e., $Sb_2O_5$, $Sb_4O_8$.

Another method of preparing $SbPO_4$ is to dissolve $Sb_2O_3$ in hot $H_3PO_4$. However, the $Sb_2O_3$ does not dissolve until the temperature of the acid solution reaches 250° C. The reaction can be written as follows:

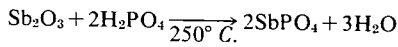

$$Sb_2O_3 + 2H_2PO_4 \xrightarrow{250°\ C.} 2SbPO_4 + 3H_2O$$

This method of obtaining antimony phosphate is undesirable because of the excess phosphoric acid required, the high temperature necessary, and the difficulties encountered in separating the antimony phosphates from the acid. Hydrolysis and the formation of other unstable antimony salts also are factors which detract from the practicality of this method. Preferably, it is desired to produce pure anhydrous antimony phosphate by a simple method which is suitable for production of commercial quantities.

It is believed, therefore, that a process that directly converts acid antimony solutions, under controlled reaction conditions, to pure anhydrous antimony phosphate, by a single precipitation procedure, without high temperatures, formation of other salts, time consuming and costly steps, and is s$itable for producing commercial quantities is an advancement in the art.

SUMMARY OF THE INVENTION

In accordance with one aspect of this invention, there is provided a process for producing anhydrous antimony phosphate directly from acidic antimony trichloride solutions, under controlled reaction conditions, by precipitation with a water-soluble orthophosphate. The process comprises reacting antimony oxide and concentrated hydrochloric acid in sufficient quantity to form antimony trichloride, and adjusting the temperature of said antimony trichloride solution and thereafter adding a water-soluble orthophosphate, (a preferred source being diammonium hydrogen phosphate solution at a temperature of at least about 75° C.) at a sufficient rate to keep the pH of the resultant reacting solution at below about pH3, digesting said reacting solution for at least about 1 hour at at least about 75° C., to thereby form a solid antimony phosphate, separating said antimony phosphate, and thereafter washing said solid with phosphoric acid, and thereafter with deionized water until substantially free of chloride ions.

DESCRIPTION OF THE PREFERRED EMBODIMENTS

For a better understanding of the present invention, together with other and further objects, advantages and capabilities thereof, reference is made to the following disclosure and appended claims in connection with the above-described description of one of the aspects of the invention.

The present invention relates to a method of directly converting acid antimony solutions to anhydrous antimony phosphate by precipitation with a water-soluble orthophosphate source. Surprisingly, it has been found that an acidic antimony trichloride solution formed from antimony oxide and hydrochloric acid, can be converted to solid anhydrous antimony phosphate by reacting said acidic solution with a water-soluble orthophosphate source, a preferred source being diammonium hydrogen phosphate, at about a temperature of at least 75° C. for at least about 1 hour, and separating said solid anhydrous antimony phosphate by conventional means such as filtering, centrifugation, decanting, and the like. Further, the preparation of anhydrous antimony phosphate is accomplished without the precipitation of byproducts, or use of high temperatures, i.e., greater than 100° C.

Concentrated hydrochloric acid, having a concentration of at least 360 grams of hydrogen chloride per liter of solution is added according to the following reaction:

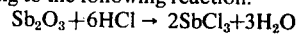

$$Sb_2O_3 + 6HCl \rightarrow 2SbCl_3 + 3H_2O$$

More dilute solutions of hydrochloric acid are avoided to prevent the formation of oxychloride salts. Likewise, other mineral acids are avoided to prevent the formation of similar oxy salts, e.g., antimony oxysulfate, antimony oxynitrate, etc.

Although 6 to 24 moles HCl per mole of antimony oxide ($Sb_2O_3$) can be used, the preferred amount of concentrated HCl is in slight excess, i.e., 9 to 15 moles HCl per mole of $Sb_2O_3$. Less than stoichiometric amounts of HCl result in hydrolysis of antimony trichloride and the formation of antimony oxychloride. Although more HCl can be used, greater amounts would not necessarily enhance the procedure, and would add undue expense.

The acid solution of antimony trichloride is preferably heated to about 75° C. prior to the addition of diammonium hydrogen phosphate. Since the temperature helps to eliminate some of the water of reaction and, to some extent, reduce the acid content of the solution, temperatures below about 70° C. are time consuming, and temperatures above 85° C. can have a detrimental effect on the reaction.

Any water soluble orthophosphate source that is soluble to the extent of 1 percent by weight in water can be used. Of these, alkali metal salts such as trisodium orthophosphate and tripotassium orthophosphate; and the ammonium orthophosphates, such as monoammonium orthophosphate and diammonium hydrogen orthophosphate; and mixtures thereof are preferred. Alkaline-earth metal orthophosphates are avoided because of the possible tendency to preferentially precipitate such salts as magnesium phosphates, barium phosphates, etc.

Especially preferred is diammonium hydrogen orthophosphate (DAP), which is added according to the following reaction: $SbCl_3 + (NH_4)_2HPO_4 \rightarrow SbPO_4 + 2NH_4Cl + HCl$ Although from about 1 to about 6 moles DAP per mole of antimony trichloride $SbCl_3$ can be used, the preferred amount of DAP is in slight excess, that is, from about 2 to about 4 moles DAP for every mole $SbCl_3$, to insure complete conversion to $SbPO_4$, and prevent formation of chloride and oxychloride compounds. Greater amounts of DAP would be uneconomical and unnecessary.

The water-soluble phosphate source, preferably DAP, is added at a sufficient rate to keep the reaction solution at a pH of below about 3.

The preferred pH range is from about 2 to below about 3 to prepare pure anhydrous antimony phosphate. Above a pH of about 3, ammonium ions are retained and ammonium salts result.

The acid antimony solution and the water-soluble orthophosphate are digested for a minimum of 1 hour to insure complete conversion of the antimony chloride and water-soluble orthophosphate to solid antimony phosphate. Digestion for shorter periods of time will result in incomplete conversion of the said reacting constituents and formation of chloride and oxychloride salts. Longer digestion periods such as 4 to 24 hours can be used, but have the inherent disadvantage of economics.

The conventional means of separating solids from liquids can be used, such as filtering, decanting, centrifugation and the like in separating solid antimony phosphate from solution.

The solid $SbPO_4$ is washed with a dilute solution, i.e., approximately 1 percent by weight of $H_3PO_4$, followed by deionized water until substantially free of chloride ions that is until less than 10 p.p.m. chloride ions remain. The washing is desirable to prevent rehydrolysis of the $SbPO_4$, to concentrate and make more dense the final product, and to purify and remove excess chloride ions, so as to prevent the formation of oxychloride salts.

To more fully illustrate the present invention, the following detailed example is presented. All parts, proportions, and percentages are by weight, unless otherwise given.

EXAMPLE 1

About 10 parts reagent grade $Sb_2O_3$ is dissolved in about 40 parts of concentrated hydrochloric acid and heated to about 75° C. About a 4M solution of diammonium hydrogen phosphate is prepared by dissolving about 53 parts DAP in 100 parts of water. The resulting solution is heated to about 75° C. and is added to the acidic antimony solution that is being stirred. The rate of addition of DAP is controlled to keep the pH of the resultant reacting solution below about 3. After digesting for about 1 hour at about 75° C., the solid $SbPO_4$ is filtered and washed with 1 percent $H_3PO_4$ followed by deionized water until the precipitate contains less than 10 p.p.m. chloride ions.

Chemical analysis, conducted at a constant pH 2, show about 56.2 percent, antimony compared to the theoretical percentage of 56.17. The melting point of the $SbPO_4$, produced by this example, is about 1,020° C. The material has a white body color and hexagonal crystal structure.

Other samples of $SbPO_4$ are prepared according to the above-mentioned procedure, except that the content of concentrated HCl ranged from 6 moles to 24 moles per mole of $Sb_2O_3$, and the content of DAP ranged from 1 mole to 3 moles per mole of antimony trichloride. Chemical analyses of all samples thus prepared show all samples to be basically the same. The percent antimony ranges from about 56.09 to about 57.20 percent, compared to the theoretical 56.17 percent. All samples exhibited a phase change at 1,020° C., when differential thermal analyses (DTA) were performed.

While there has been shown and described what are at preset considered the preferred embodiments of the invention, it will be obvious to those skilled in the art that various changes and modifications may be made herein without departing from the scope of the invention as defined by the appended claims.

What is claimed is:

1. A process for preparing anhydrous trivalent antimony orthophosphate comprising the steps of
   a. forming an aqueous reaction medium comprising trivalent antimony oxide and an aqueous solution of hydrochloric acid having a concentration of at least about 360 g./l. in at least stoichiometric amounts to form antimony trichloride;
   b. adjusting the temperature of said resulting reaction medium to at least about 70° C.;
   c. adding an aqueous water-soluble orthphosphate source selected from the group consisting of ammonium orthophosphates, alkali metal orthophosphates and mixtures thereof, having a temperature of at least about 70° C., at a sufficient rate to keep the pH of the resultant reacting solution at below about 3;
   d. digesting said reacting solution for at least about 1 hour at least about 70° C., to thereby form a two-phase system comprising solid trivalent antimony orthophosphate and an aqueous phase;
   e. separating said solid trivalent antimony orthophosphate from the aqueous solution, and
   f. thereafter washing said solid with a relatively dilute aqueous phosphoric acid solution and thereafter with deionized water until substantially free of chloride.

2. A process according to claim 1, wherein said pH range is from about 2 to below about 3.

3. A process according to claim 1, wherein said temperature is from about 70° C. to about 85° C.

4. A process according to claim 1, wherein the molar ratio of said antimony oxide to said aqueous hydrochloric acid solution is from about 1:6 to about 1:24.

5. A process according to claim 4, wherein the molar ratio of said antimony oxide to said aqueous hydrochloric acid solution is from about 1:9 to about 1:15.

6. A process according to claim 1, wherein said water-soluble orthophosphate is diammonium hydrogen phosphate.

7. A process according to claim 6, wherein the molar ratio of said diammonium hydrogen phosphate to said antimony trichloride is from about 1:1 to about 6:1.

8. A process according to claim 6, wherein the molar ratio of said diammonium hydrogen phosphate to said antimony trichloride is from about 2:1 to about 4:1.

* * * * *